March 4, 1924.

K. ROSS

CHECK PROTECTOR

Filed Jan. 26, 1923

Inventor
Karl Ross
By
his Attorney

March 4, 1924.

K. ROSS

CHECK PROTECTOR

Filed Jan. 26, 1923  5 Sheets-Sheet 2

1,485,885

Inventor
Karl Ross
his Attorney

March 4, 1924.
K. ROSS
CHECK PROTECTOR
Filed Jan. 26, 1923   5 Sheets-Sheet 3
1,485,885
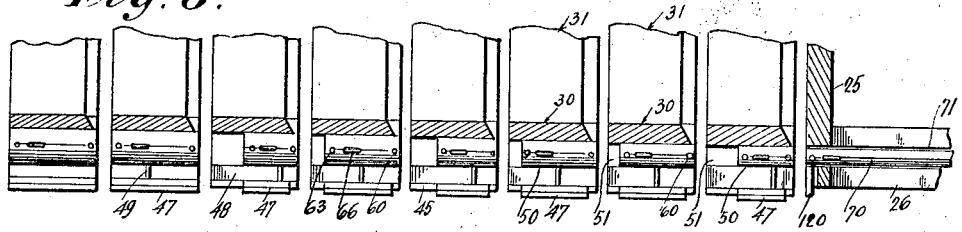
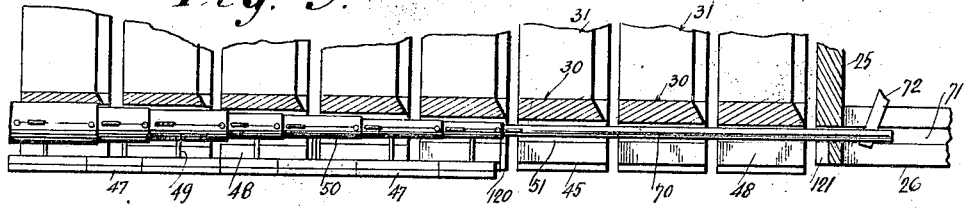
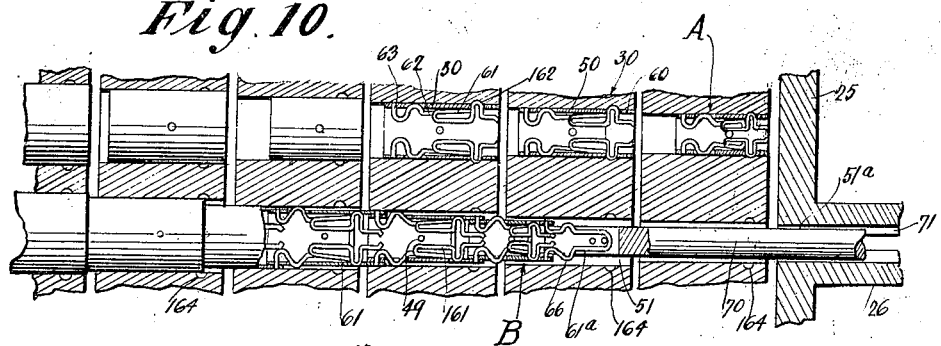
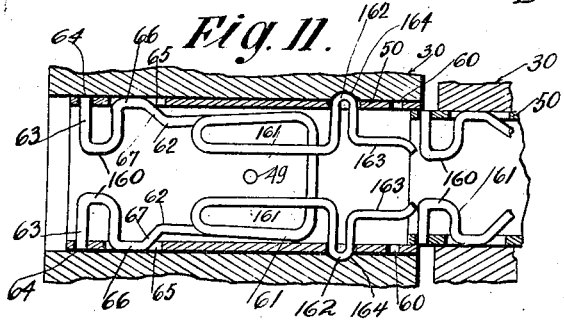
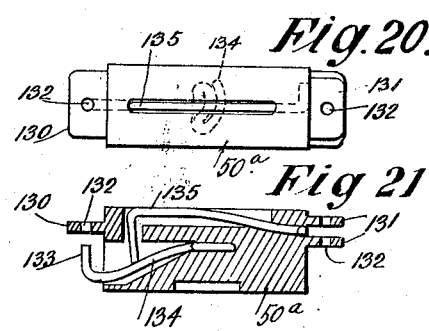
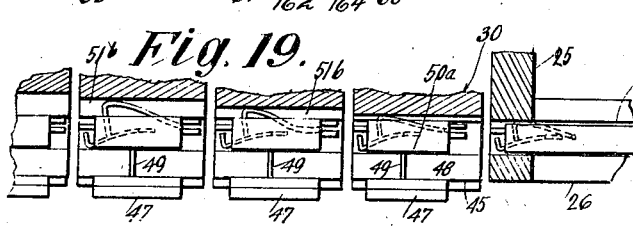
Inventor
Karl Ross
by
his Attorney March 4, 1924.
K. ROSS
CHECK PROTECTOR
Filed Jan. 26, 1923
1,485,885
5 Sheets-Sheet 4
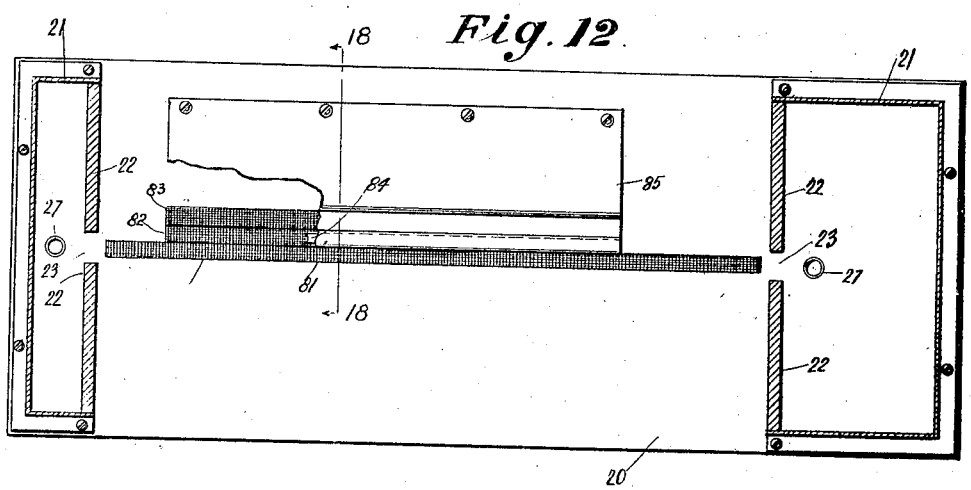
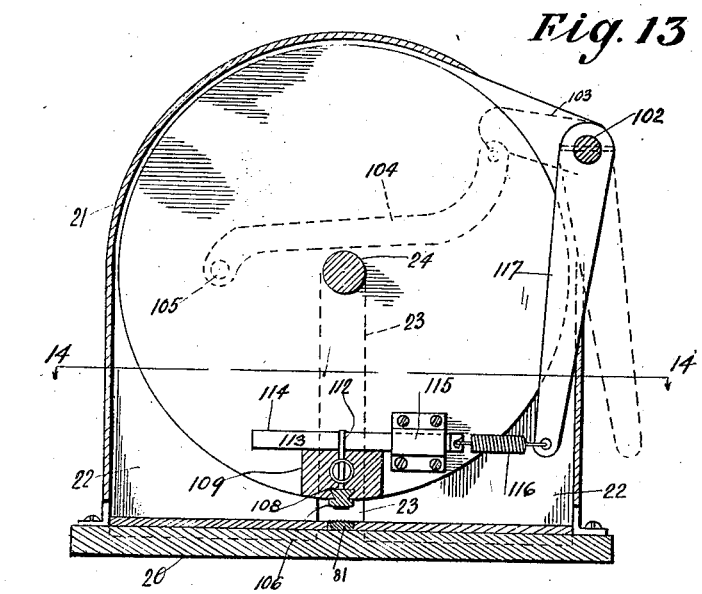
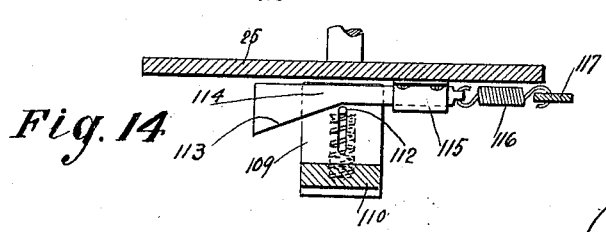
INVENTOR
KARL ROSS
BY
his ATTORNEY.

March 4, 1924.
K. ROSS
CHECK PROTECTOR
Filed Jan. 26, 1923     5 Sheets-Sheet 5
1,485,885
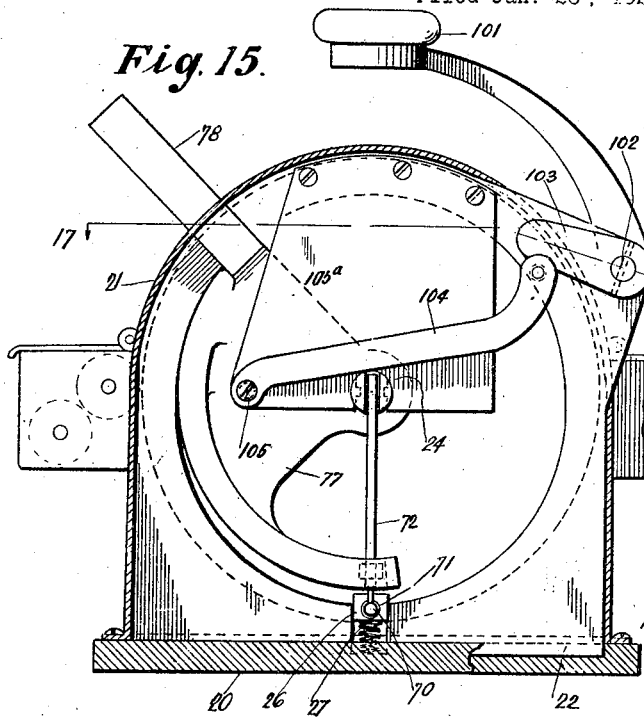
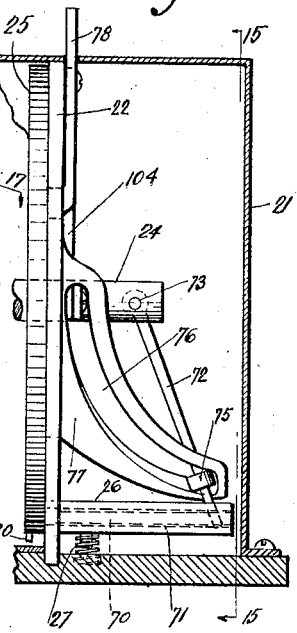
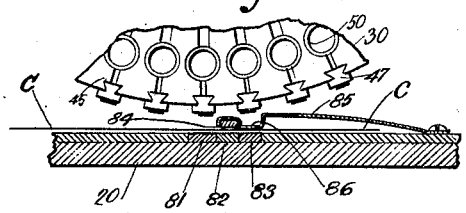
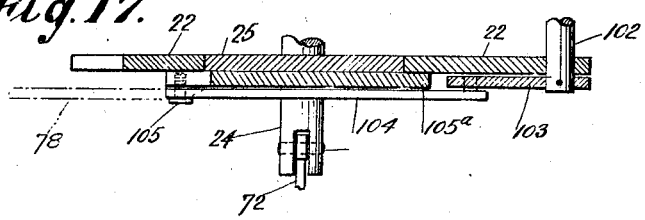
INVENTOR
KARL ROSS
BY
his ATTORNEY.

Patented Mar. 4, 1924.

1,485,885

UNITED STATES PATENT OFFICE.

KARL ROSS, OF LOS ANGELES, CALIFORNIA.

CHECK PROTECTOR.

Application filed January 26, 1923. Serial No. 615,019.

*To all whom it may concern:*

Be it known that I, KARL ROSS, a citizen of Russia, having declared my intention of becoming a citizen of the United States, residing in Los Angeles, county of Los Angeles, State of California, have invented new and useful Improvements in Check Protectors, of which the following is a specification.

This invention relates to devices for printing and protecting checks and the like; and although I here speak of the invention as being a check protector it will be understood that the invention may be capable of other uses—it is not necessarily limited to printing specifically a check, although for the purposes in rendering my invention most clearly intelligible I will explain it in detail as applied to printing and protecting a bank check.

There are many objects and corresponding accomplishments of the invention, most of which will be best understood from the following detailed explanation of a preferred embodiment of the invention; but I may state at the outset that one of the primary objects of the invention is to provide a device that, after the several printing devices are set in any selected positions to print any desired amount, then a single operation is all that is necessary to do the printing. In check protectors and writers of which I am aware the printing of the amount on the check has heretofore been done by several successive operations. For instance, if it is desired to write a check for one thousand one hundred five dollars and fifty cents, the first printing operation has been to print the "one thousand" and then successive printing operations have been used to print the "one hundred" and the "five" and so on. Of course it has also been necessary to select these particular amounts by some operation or other. In my mechanism, once the characters to print the amount have been selected, the printing itself is accomplished by a single operation, and the whole of the printing on the check is done at one time.

There are numerous other objects and corresponding features of the invention; but an understanding of the mechanism itself will enable such objects and features to be most clearly understood, and so, for the purpose of giving a full understanding of the invention I illustrate in the accompanying drawings and describe in detail in the following description a specific and preferred form of mechanism. This I do without necessarily limiting the invention to the particulars hereinafter set out.

In order to facilitate a comprehensive understanding of the mechanism now to be explained, I will first give a general idea of that mechanism and its outstanding features. The type bars for the several denominations are carried on a series of wheels each rotatable to bring any selected type bar into what I will term the printing line, which here happens to be selected at the lowermost point of the wheels. Each wheel is loosely mounted on a longitudinal supporting shaft and is provided with means for individually turning it. This longitudinal shaft is supported in such a manner that it and all the wheels can be moved down by a single operation to print upon a check inserted under the wheels. Previous to the final operation of printing however, the type bars in the printing line have been slid longitudinally toward one end of the machine so that, prior to the printing operation, all the selected type bars have been moved up against one another to make what amounts to an unbroken line of type, leaving no spaces between adjacent type bars and thus making the final printing practically continuous. This eliminates entirely the possibility of any insertion being made in any blank space.

I will now refer more particularly to the accompanying drawings wherein I illustrate a specific and preferred form of mechanism and in which drawings:—

Fig. 6 showing the parts in normal position;

Figs. 6 and 7 showing a plurality of relatively long type bars;

Figs. 8 and 9 are similar sections showing some long and some short type bars;

Fig. 10 is a longitudinal horizontal section on line 10—10 of Fig. 7;

Fig. 11 is an enlarged sectional view of one of the elements shown in Fig. 10; Figs. 10 and 11 showing also certain locking means hereinafter referred to;

Fig. 12 is a plan section on line 12—12 of Fig. 2;

Fig. 13 is a transverse section on line 13—13 of Fig. 2;

Fig. 14 is a fragmentary horizontal section on line 14—14 of Fig. 13;

Fig. 15 is an end view of the mechanism and a section through the case taken as indicated by line 15—15 on Fig. 1;

Fig. 16 is a side elevation of the parts shown in Fig. 15, with the case in section;

Figure 1:
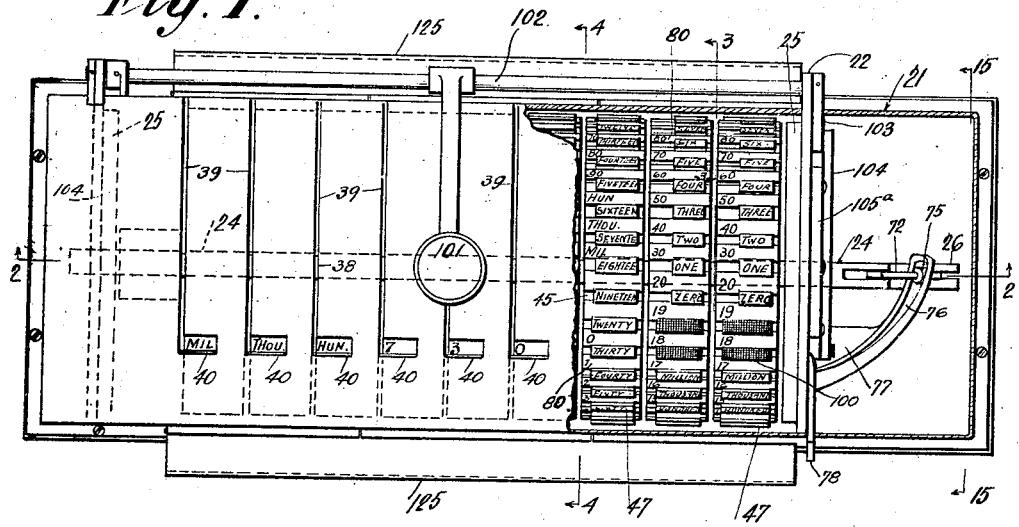
Fig. 1 is a plan of the machine with a part of the case broken away.

Fig. 17 is a fragmentary section on line 17—17 of Fig. 15 and; Fig. 18 is a fragmentary section on lines 18—18 of Figs. 2 and 12.

Fig. 19 is a view similar to Fig. 8 showing a modification and

Figs. 20 and 21 are, respectively, a plan and a longitudinal vertical section of one of the elements shown in Fig. 19.

In the drawings I show at 20 a suitable base and at 21 a case suitable to enclose the working mechanism. On the base I mount two upright frame members 22 with vertical slots 23 through which the central longitudinal shaft 24 extends. This shaft is mounted in two upright standards 25 having feet at 26 normally supported by compression springs 27, so that the shaft and all the wheels thereon are normally supported in such a position as indicated in the drawings. These parts are non-rotary, the wheels only rotating on the shaft 24. The number of wheels in the mechanism depends upon the number of denominations it is desired to print; and so that number may be varied. I show sufficient printing wheels here to print into the millions denomination.

Figure 4:
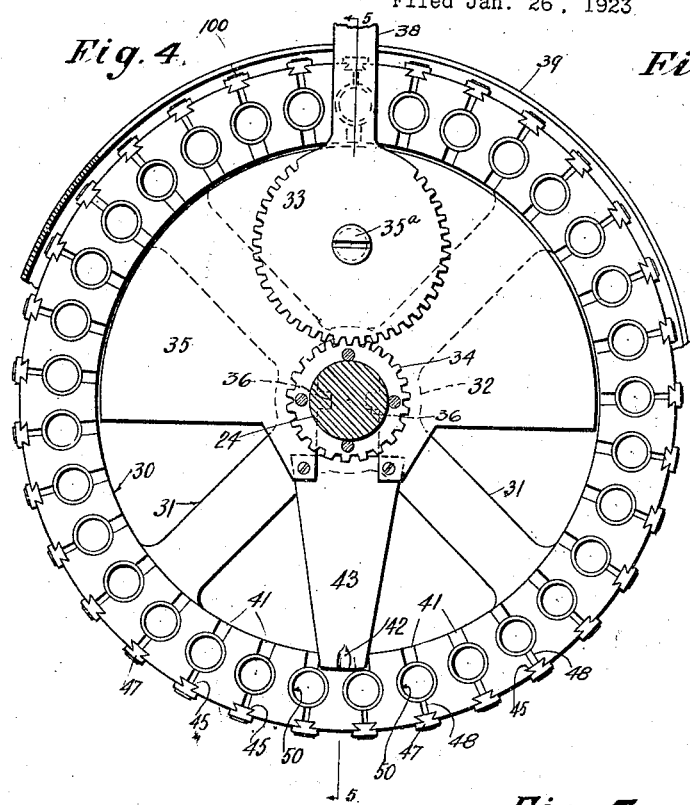
Fig. 4 is an enlarged cross section on lines 4—4 of Figs. 1 and 5 but showing only the printing wheel, not showing the whole of the surrounding case or the base.
Figure 5:
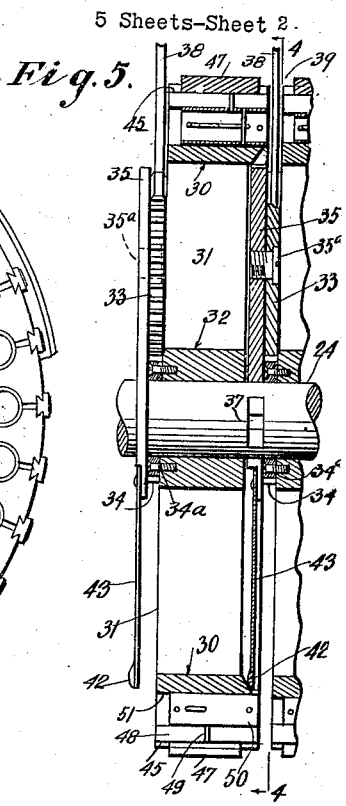
Fig. 5 is a section on line 5—5 of Fig. 4.

Each wheel, as I show it in the drawings, comprises a rim 30 and supporting arms 31 mounted on a wheel hub 32 that turns freely on shaft 24. The arms 31 are inset from one face of the rim to provide space for the individual rotating mechanism that is applied to each wheel. This rotating mechanism for each wheel comprises a gear 33 meshing with a smaller gear (one half the size) 34 attached at 34$^a$ to hub 32. The larger gear 33 is mounted on a stud 35$^a$ secured in supporting plate 35 that is stationarily mounted on shaft 24. By inspection of Figs. 4 and 5 it will be seen that plate 35 has two inwardly projecting lugs 36 that fit in depressions 37 in stationary shaft 24. A handle 38 is attached to gear 33 and these handles extend radially outwardly through slots 39 in the case, these slots being long enough to allow gear 33 to be rotated one-half of a revolution, and therefore to rotate each wheel a whole revolution. There is also in the case an opening at 40 over each wheel through which the designations on the wheel may be observed, in order to set each wheel in any selected position. And in order that the wheels may be easily set in exact positions, each wheel has notches 41 in the inner part of its rim edge (see Figs. 4 and 5) and a stationary detent 42 supported on a spring arm 43 is adapted to engage these notches and yieldingly hold the wheel in proper registering position. Spring arm 43 is supported on stationary plate 35 as illustrated.

Each wheel has a plurality of type bar receiving slots 45 cut across its face. These slots are preferably key-shaped in section and receive and slidably hold the key-shaped parts of the type bars 47. Type bars 47 may be, as hereinafter explained, either of a length substantially equal to the width of the wheel or of a shorter length.

Reaching back from each type bar slot 45 there is a narrow slot 48 adapted to pass the pin 49 that connects each type bar with its corresponding member 50 that slides in an opening 51 extending through the wheel rim. In this particular instance I show these members 50 and the openings 51 as being cylindrical, members 50 being in the form of telescoping tubes as is readily apparent from the drawings. All the tubes in any one wheel are of the same size; and all the tubes of the next adjacent wheel are of a different size. Looking at the drawings, it will be seen that the cylindrical openings 51 and members 50 for the wheel at the extreme right are smallest; then the tubes 50 in the wheel next toward the left are enough larger that the tubes 50 of the right hand wheel may enter tubes 50 of the next wheel to the left. And this progression of size, providing for telescoping action of the tubes, is continued on throughout the series of wheels.

Each one of the tubes 50 is constructed as perhaps is best shown in detail in Figs. 6 to 11. Each tube fits its own chamber 51 fairly snugly but, as will be apparent, has a clearance in the next and all succeeding chambers 51. Each tube has, at its right hand end in the drawings, a pair of apertures 60 and contains a spring member constructed of wire or other suitable material as shown at 61. This spring member 61 is in general U-shaped and has, near the ends of its two arms 62, two outwardly extending terminals 63, the outer ends of which normally lie in openings 64 in the walls of the tube at the end opposite the openings 60. Near the left hand end of each tube, as shown in the drawings, there are also slots 65 through which projecting portions 66 of the spring may project. In Fig. 11 the spring is shown in its normal position, compressed into tube 50, being held in this position by the engagement of projections 66 with the walls of chamber 51 in which the tube normally stands. For instance, at A in Fig. 10 a tube is shown in its normal position in its own chamber 51. These projections 66 have diagonal parts or surfaces 67 by which the springs are pushed inwardly when the tube is moved for instance from the position B in Fig. 10 back to position A, these diagonal portions 67 engaging with the end of chamber 51 and thus forcing the spring terminals inwardly.

Figure 7:
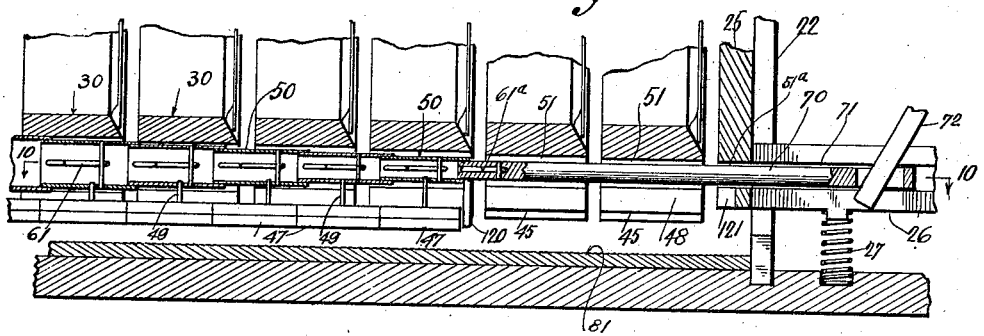
Fig. 7 is a similar section showing the parts in the position they assume when the type bars are slid longitudinally to bring them together.
Figure 6:
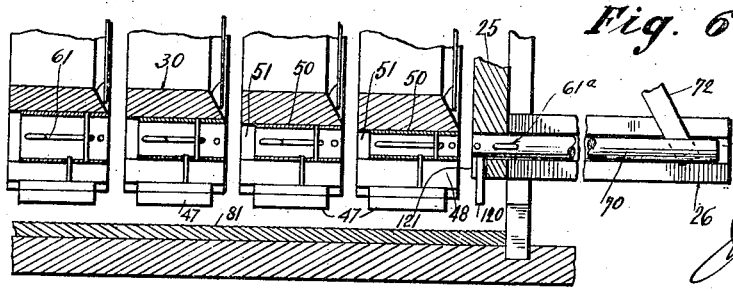
Fig. 6 is an enlarged fragmentary longitudinal section showing in greater detail certain parts shown in similar section in Fig. 2.

At the right hand end of the machine as shown in the drawings there is a longitudinally sliding rod 70 mounted in a horizontal tube 71 mounted on standard 25 which rod is adapted to be moved back and forth between such positions as illustrated in Figs. 6 and 7. This rod is actuated by an arm 72 connected at its free end with rod 70 and pivoted at 73 to the extending end of stationary shaft 24. This rod carries near its free end a roller 75 that rides in a cam slot 76 in a member 77 rotatably mounted on the extension of shaft 24 and rotatable by a handle 78 that extends out through the case. From the drawings it will be apparent how rod 70 can be moved back and forth by rotating handle 78.

Figure 2:
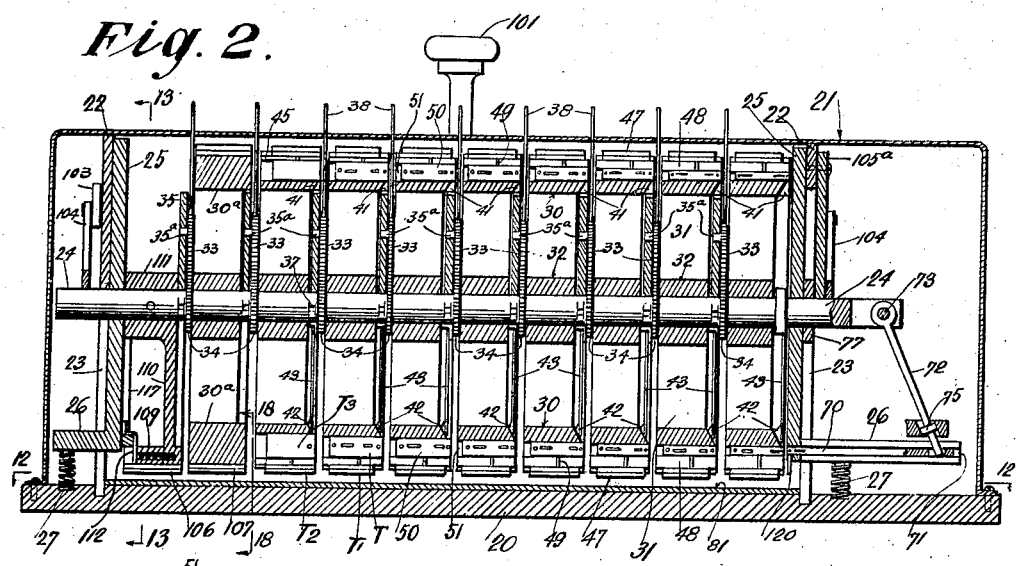
Fig. 2 is a vertical longitudinal section on line 2—2 of Fig. 1.

Rod 70 has on its end a spring 61ª just like the springs 61 of the various tubes 50. (See particularly Fig. 10). The bore or chamber 51ª of tube 71 is smaller than the first wheel chamber 51, so that when rod 70 is drawn back into bore 51ª the spring 61ª is compressed inwardly in exactly the same manner as the springs 61 are compressed inwardly when drawn into their respective chambers. Thus, with rod 70 standing in its normal position as illustrated in Figs. 2 and 6, spring 61ª is within the bore 51ª and is collapsed. When rod 70 is moved to the left in the drawings, its end enters the right hand end of the first tube 50; and just as the terminals of spring 61ª come opposite the holes 60 of the first tube, the projections 66 of spring 61ª pass out of bore 51ª and the spring is allowed to expand, and its terminals enter the holes 60 of that first tube. Then on further movement toward the left this first tube and the rod move together; and the left hand end of the first tube enters the right hand end of the second tube, and just as terminals 63 of spring 61 come into register with holes 60 of the second tube, the projections 66 of the spring of the first tube pass out of its chamber 51 and the terminals are allowed to move outwardly into the holes 60 of that second tube. Then on further movement of rod 70 toward the left both these tubes move with the rod. Similarly each successive tube enters and engages the end of the next tube and carries that tube on toward the left, until the last tube (lettered T³ in Fig. 2) is reached and moved over toward the left to the limit of its movement. Thus it will be seen that the tubes are all compacted toward the left; and with the tubes the several type bars also move toward the left and are compacted, the type bars moving from slot to slot of the several wheels which have been put into alinement. The tubes and type bars are limited in their movements to the left (come up against a stop) in the following manner. The next to the last tube T carries its type bar T¹ into endwise abutment with type bar T² in the next to the last wheel toward the left. And at the same time tube T engages the tube T³ in the next to the last wheel toward the left, and can then carry that tube and its type bar T² to the left until type bar T² abuts type bar 107 that is non-slidably mounted in rim 30ª of the last wheel at the left. Thus all the type bars are moved from such a position as is shown in Figs. 2, 6 and 8 to such positions as shown in Figs. 7 and 9, all the type bars then forming a solid line of type without any intervening spaces.

It will be understood that before the tubes and type bars are moved over to the left, proper selection of the type desired has been made by proper operation of handles 38. To facilitate this selection there are, on each wheel, numeral indications as shown at 80 in Fig. 1, on the wheel run spaces between the type bars, which numeral indications become visible through openings 40 when the corresponding type bar (preferably carrying the amount in writing) is in proper alinement at the bottom of the wheel.

The amounts denoted by the printed words carried by the type bars of the several wheels may be selected to suit the particular use to which the machine is to be put; just as the number of wheels and the number of denominations that can be printed can be selectively varied. Also each wheel may carry one type bar that is either blank or carries the designation "zero" or it may carry both one or two blank type bars and a zero type bar, to be used as occasion requires when there is no positive number of that particular denomination to be printed. In the case of the blank type bar its face may be provided with a plain or paper perforating corrugation as indicated at 100, to act in conjunction with base strip 81 to perforate the paper in what would otherwise be an empty space.

After proper selection and compacting of the type bars has been done, then the whole wheel mechanism is moved down to impress the line of type on a check which has been inserted over base 20, as illustrated at C in Fig. 18. In the base there are inserted suitable base strips or plates 81, 82 and 83 over which the check is inserted. The lowermost and compacted line of type bars comes down directly over the base strip 81. This strip may be provided with such a surface as will cause the check to be perforated at the same time that it is printed upon. Above strip 82, which may have a similar check perforating surface, is a type bar 84 held in a spring plate 85; and this type bar 84 may conveniently carry the name of the firm issuing the check or any other convenient or suitable data or information. The spring plate 85 may also have a portion 86 over the base strip 83 which will coact with the base strip to perforate the check along the space, for instance, where the name of the payee is usually written. When the wheels move downwardly spring plate 85 is engaged by the wheels and is pressed down onto the check at the same time that the selected line of type is pressed down onto the check. Thus, by a single operation all of the printing and protecting of the check is accomplished.

After the wheels have been allowed to rise to their normal positions, lifted by springs 27, then the handle 78 is rotated back to its normal position to withdraw rod 70. On this withdrawal the several tubes 50 are thrown back to their normal positions, and with the tubes the type bars are also drawn back to their normal positions. After the connected tubes begin to move back toward the right in the drawings, pulled by rod 70, the tube furthest to the left in the drawings is first disconnected from the string of tubes when the spring projections 66 of the next to the last tube pass into the chamber in the wheel in which that tube normally belongs. Then the successive tubes are successively dropped in the same manner, each in its proper position in its proper wheel, until near the end of the movement of rod 70 there is left only one tube attached to the rod and this last tube at the right is drawn into its proper chamber and then when the spring projections 66 of spring 61ª on the rod engage the bore 51ª, that last tube is disengaged and left standing in its proper chamber and proper wheel. Each of the tubes, it will be readily seen, will be left standing in its proper wheel in just the position at which spring projections 66 of the next tube toward the right pass into its chamber; and therefore each tube is thus left in proper position so that the spring terminals will register with holes 60 in the several tubes when the tubes are again moved towards the left.

The tubes and type bars now being all returned to their normal positions in their proper wheels, the wheels may then be turned to any other combination for another operation.

In order to lock tubes 50 and the type bars against accidental movement out of proper normal position, I provide detent springs 161 that may be formed with springs 61. (See particularly Figs. 10 and 11.) These springs 161 have detents 162 that normally engage in depressions 164 to hold the tubes in proper position. And they also have diagonal end parts 163 that are engaged by parts 160 of springs 61 just prior to springs 61 reaching the point where they are allowed to expand to insert ends 63 in holes 60. Parts 160 act to compress parts 163 and draw the detents inwardly, and then immediately afterward, as the tube at the right moves further into the tube at the left (Fig. 11) the ends 63 enter holes 60. On movement back toward the right, when a spring 61 is compressed by entering its own chamber 51, and the tubes thus disconnected, the detents 162 again spring out into depressions 164.

I have described how the spring detents 42 hold the several wheels in proper positions to align their type bar slots. By this means the type bar slots of the several wheels are aligned, so that the type bars and tubes 50 may move from one wheel to the next. When the type bars are compacted toward the left in the drawings, they will as a general rule stand in such positions that each type bar is in a slot of two adjacent wheels. Of course it may happen at times that the end of a type bar may come at a gap between wheels; but as a general rule the type bars will bridge the gaps between wheels; and in so doing the type bars provide a positive and rigid aligning means for the wheels, positively preventing them from accidentally moving out of alinement during the printing operation. The line of type bars becomes in effect a solid and rigid line during the operation of printing.

As I have said before, some of the type bars are short and some long. In fact, they may be of any suitable length, depending upon the length of the printed word they carry. By thus making the lengths of the type bars correspond to the length of the printed word, the printed words on the line of type bars, when compacted in the machine, will all be close spaced, thus obviating any possibility of interjections being made. The tubes are also of lengths corresponding to the lengths of the type bars. The travel of rod 70 toward the left in the drawings is sufficient to compact the shortest line of type bars used; and the travel of rod 70 toward the left will vary according to varying selections of type bars. Thus for instance in Fig. 7 I have shown a line of comparatively long bars compacted toward the left, Fig. 6 showing those bars in their normal positions. In Figs. 8 and 9 I have shown corresponding views of type bars of varying lengths, including some shorter ones. In Fig. 9 rod 70 has travelled further to the left than in Fig. 7. It is not, however, incumbent upon the operator to use any judgment in moving rod 70 just the right distance toward the left as in any case he moves handle 78, and thus moves rod 70 toward the left, as far as it will go.

Any suitable means may be used for depressing the wheels during the printing operation. For instance, I may use a handle 101 mounted on a longitudinal shaft 102 at the rear side of the machine, and this shaft may have at each end an arm 103 that is depressed, when handle 101 is depressed, onto an arm 104 pivoted at 105 on plate 105ª and bearing down on the shaft 24. By such an arrangement as this sufficient leverage can be developed to give adequate printing pressure. During the first part of downward movement of handle 101 a type bar 106 is moved over toward the right in the drawings (see Fig. 2) against the type bar 107 which is stationary in wheel rim 30ª. This single type bar 106 is mounted slidably in a slot 108 in a block 109 carried by an arm 110 having a hub 111 fixed on the stationary shaft 24. Type bar 106 has an upwardly projecting pin 112 that is acted upon by the wedge face 113 of a wedge bar 114 mounted in a sliding bar 115. The end of this bar is connected by spring 116 with the free end of an arm 117 mounted on shaft 102 heretofore referred to; and when this shaft is rotated by depressing handle 101, then wedge bar 114 is drawn toward the right in Figs. 13 and 14, moving the pin 112 and type bar 106 in a direction toward the right in Fig. 2, sliding that type bar against type bar 107. The type bar 106 is designed ordinarily to carry the word "pay" or some similar designation.

At the forward end of rod 70 there is a depending key pin 120 that normally lies in slot 121 and thus normally keeps rod 70 in proper alinement for its spring 61ª to properly align with the first tube; and also that key pin, on movement of rod 70 toward the left, engages and pushes against the end of the first type bar 47. Thus the rod not only moves the type bars to the left through the intervention of the tubes 50 but also moves them through this key 120. Each of tubes 50 is kept in proper alinement for interengagement of springs 61, by the pins 49 that ride in slots 48.

Figure 3:
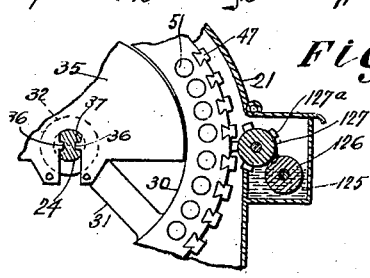
Fig. 3 is a fragmentary cross section illustrating the application of ink to the type bars and taken as indicated by line 3—3 on Fig. 1.

To ink the type bars I may provide any suitable arrangement, such as is shown in detail in Fig. 3. Here I provide a small ink receptacle 125 carrying an ink fed roller 126 that distributes ink on inking roller 127 that contacts with the type bars and has teeth 127ª that mesh with the type bars to cause rotation to evenly distribute the ink.

In Figs. 19, 20, 21 I show a slight modification of the member 50. Here each member 50ª has at one end a tongue 130 and at the other end a complementary pair of lugs 131 to receive tongue 130 of the next member, the tongues and lugs being perforated at 132 to receive the end 133 of a spring 134 that is normally kept in the position shown in the drawings by a spring 135 that engages the bottom of a groove 51ᵇ in the wall of that chamber. The chambers are all of the same size, but the grooves are successively deeper in the successive wheels toward the left, and each spring 135 is shaped to depress spring 134 when in its own chamber. Thus when one member 50ª is moved toward the left its spring 134 is released to move its end into perforations 132 which are then aligned. Rod 70 is equipped with the same interengaging means. The functions of these devices will be seen to be the same as the ones heretofore described.

Having described a preferred form of my invention, I claim:—

1. In a device of the character described, a plurality of individually movable type carriers which may be moved to put selected types into a printing line, a depressible mounting common to all the type carriers, and a single means to depress the mounting and all the type carriers at a single operation; said type carriers being arranged alongside each other and having type bar slots which are brought into register when selected type is put into the printing line, type bars slidably carried in the slots of the several carriers, and means to slide the type bars from slot to slot in the several carriers to move them into a compact printing line.

2. In a device of the character described, a plurality of individually movable type carriers which may be moved to put selected types into a printing line, a depressible mounting common to all the type carriers, and a single means to depress the mounting and all the type carriers at a single operation; said type carriers being arranged alongside each other and having type bar slots which are brought into register when selected type is put into the printing line, type bars slidably carried in the slots of the several carriers, and means to slide the type bars from slot to slot in the several carriers to move them into a compact printing line, and the type bars being of such lengths that when so compacted they will at least in part bridge the spaces between adjacent type carriers to lock the carriers immovable with relation to each other.

3. In a device of the character described, a depressibly mounted shaft, a plurality of type carrying wheels independently rotatively mounted on said shaft so that each wheel may be independently rotated to put any selected type into a printing line, and a single means to depress the shaft and all the type carrying wheels at a single operation; said type carrying wheels being arranged alongside each other and having transverse type bar slots that are brought into register when selected types are put into the printing line, type bars slidably mounted in said slots, and means to slide the type bars from slot to slot of the several wheels to move them into a compact printing line.

4. In a device of the character described, a depressibly mounted shaft, a plurality of type carrying wheels independently rotatively mounted on said shaft so that each wheel may be independently rotated to put any selected type into a printing line, and a single means to depress the shaft and all the type carrying wheels at a single operation; said type carrying wheels being arranged alongside each other and having transverse type bar slots that are brought into register when selected types are put into the printing line; and type bars slidably mounted in said slots, and means to slide the type bars from slot to slot of the several wheels to move them into a compact printing line, and the type bars being of such lengths that when so compacted at least some of them bridge spaces between adjacent wheels to lock the wheels immovable with relation to each other.

5. In a device of the character described, a plurality of individually movable type carriers each having a plurality of spaced transverse slots, the slots in the several carriers being adapted to be selectively brought into register, type bars slidably mounted in the several carriers, and means to slide the type bars through the registered slots of the several carriers.

6. In a device of the character described, a plurality of individually movable type carriers each having a plurality of spaced transverse slots, the slots in the several carriers being adapted to be selectively brought into register, type bars slidably mounted in the several carriers, and means to slide the type bars through the registered slots of the several carriers to close up selected type bars in a compact printing line, said sliding means also embodying means to return the type bars and leave them normally standing in their respective carriers.

7. In a device of the character described, a plurality of individually rotatable type carrying wheels arranged alongside each other on a common axis, said wheels having transverse peripheral slots adapted to be selectively brought into register with each other in a printing line, type bars in the slots of the several wheels, and means to slide the type bars along the registered slots of the several wheels in the printing line and to return such type bars to normal position in their respective wheels.

8. In a device of the character described, a base and frame, a horizontal shaft mounted in the frame above the base and vertically movable toward the base, a plurality of type carrying wheels mounted on said shaft and individually rotatable thereon, individual means for rotating each wheel, each wheel having a plurality of transverse peripheral type bar slots adapted by rotation of the several wheels to be selectively brought into register in a printing line directly above the base, type bars slidably mounted in the several slots of the several wheels and slidable from wheel to wheel through the registered slots, a type moving bar mounted to move longitudinally in line with the registered type bars in the printing line, means to connect said rod to one of the type bars and to interconnect the several type bars in the printing line, said means being disconnectible when the several type bars are moved back to normal positions in their respective wheels; and a single manually operable means to depress said shaft and all the type carrying wheels at a single operation.

9. In a device of the character described, a plurality of independently movable type carriers arranged alongside each other and having each a plurality of transverse type bar slots adapted to be selectively brought into register, each carrier having transverse openings therethrough one for each type bar slot, and the openings in the several carriers being so positioned with relation to the type bar slots that when selected slots are brought into register then the corresponding openings are also brought into register; type bars slidably mounted in the slots in the several carriers and adapted to be moved from carrier to carrier through the slots that are brought into register, a type bar moving member mounted slidably in each of said openings and connected to their respective type bars and movable from carrier to carrier through the registered openings, said openings being of progressively different sizes in the several carriers, each of said members being provided with an expansive means adapted to engage and connect with the next one of said aligned members when the expansive means is moved into an opening of larger size, and each of said expansive means adapted to be contracted to release connection with the next said member when withdrawn into its own opening.

10. In a device of the character described, a plurality of independently movable type carriers arranged alongside each other and having each a plurality of transverse type bar slots adapted to be selectively brought into register, each carrier having transverse openings therethrough one for each type bar slot, and the openings in the several carriers being so positioned with relation to the type bar slots that when selected slots are brought into register then the corresponding openings are also brought into register; type bars slidably mounted in the slots at the several carriers and adapted to be moved from carrier to carrier through the slots that are brought into register, a type bar moving member mounted slidably in each of said openings and connected to their respective type bars and movable from carrier to carrier through the registered openings, said openings being of progressively different sizes in the several carriers, each of said members being in the form of a tube of a size to slidably fit in its corresponding opening, and the several tubes in the several carriers being adapted at their adjacent ends to telescope with each other, each of said members having near its one end an opening through its wall and having at the other end an outwardly expansive spring with an end portion adapted to enter the wall opening in the next adjacent member, said outwardly expansive spring having an outward projection adapted normally by engagement with the wall of the corresponding carrier opening to press the spring inwardly and to allow the spring to move outwardly when any one of said members is moved out of its own carrier opening; and a rod movable longitudinally along the line of the registered openings and having a spring like those heretofore stated adapted to connect with the wall opening in the type moving member that stands at the end of the registered line.

11. In a device of the character described, a plurality of individually movable type carrying members arranged side by side and each having a plurality of type bar slots adapted to be selectively moved into alinement with each other in a printing line, type bars slidable in the slots of the several carriers, means to slide the type bars through said registered slots toward one end of the device, another slotted type carrier permanently arranged with its slot in alinement in the printing line at the end of the device toward which the several type bars are moved, a type bar slidable in the slot of said last mentioned carrier, and means to slide said last mentioned type bar in a direction opposite to that in which the first mentioned type bars are moved.

12. In a device of the character described, a plurality of individually movable type carrying members arranged side by side and each having a plurality of type bar slots adapted to be selectively moved into alinement with each other in a printing line, type bars slidable in the slots of the several carriers, means to slide the type bars through said registered slots toward one end of the device, another slotted type carrier permanently arranged with its slot in alinement in the printing line at the end of the device toward which the several type bars are moved, a type bar slidable in the slot of said last mentioned carrier; a single means to displace all of the type carriers together at a single operation, and means in conjunction with said last mentioned means to slide the last mentioned type bar in a direction opposite to that in which the first mentioned type bars are moved.

13. In a device of the character described, a plurality of individually movable type carriers arranged alongside each other and each having type bar slots which are selectively brought into register when selected type bars are moved by movements of the carriers into a printing line, type bars carried in the slots of the several carriers and slidable in the carrier slots from carrier to carrier, and means to slide the type bars from slot to slot in the several carriers to move them into a compact printing line.

14. In a device of the character described, a plurality of individually rotatable wheel type carriers arranged on a common axis side by side and each having axial peripheral type bar slots which are selectively brought into register when selected type bars are moved by movements of the carriers into a printing line, type bars carried in the slots of the several carriers and slidable in the carrier slots from carrier to carrier, and means to slide the type bars from slot to slot in the several carriers to move them into a compact printing line.

15. In a device of the character described, a plurality of individually movable type carriers arranged alongside each other and each having type bar slots which are selectively brought into register when selected type bars are moved by movements of the carriers into a printing line, type bars carried in the slots of the several carriers and slidable in the carrier slots from carrier to carrier, and means to slide the type bars from slot to slot in the several carriers to move them into a compact printing line, and the type bars being of such lengths that when so compacted they will at least in part bridge the spaces between adjacent type carriers to lock the carriers immovable with relation to each other.

16. In a device of the character described, a plurality of individually movable type carriers arranged alongside each other and each having type bar slots which are selectively brought into register when selected type bars are moved by movements of the carriers into a printing line, type bars carried in the slots of the several carriers and slidable in the carrier slots from carrier to carrier, and means to slide the type bars from slot to slot in the several carriers to move them into a compact printing line, a support for a sheet to be printed on, and a single operating means to actuate the type bar sliding means and to cause relative movement between the type carriers and the support to bring the selected type against the sheet.

In witness that I claim the foregoing I have hereunto subscribed my name this 16th day of January, 1923.

KARL ROSS.